United States Patent [19]

McShane

[11] 3,881,352

[45] May 6, 1975

[54] FLOWMETER APPARATUS AND METHOD

[75] Inventor: James L. McShane, Pittsburgh, Pa.

[73] Assignee: Westinghouse Electric Corporation, Pittsburgh, Pa.

[22] Filed: July 31, 1972

[21] Appl. No.: 276,479

[52] U.S. Cl. ............................................. 73/194 B
[51] Int. Cl. ............................ G01f 1/00; G01p 5/18
[58] Field of Search .......... 73/194 A, 194 B, 67.5 R

[56] References Cited
UNITED STATES PATENTS

| | | | |
|---|---|---|---|
| 2,813,424 | 11/1957 | Liepmann et al. ..................... | 73/194 |
| 3,440,876 | 4/1969 | Hayes et al. .......................... | 73/194 |
| 3,512,400 | 5/1970 | Lynnworth............................ | 73/67.5 |
| 3,521,483 | 7/1970 | Miller et al. .......................... | 73/67.5 |
| 3,575,050 | 4/1971 | Lynnworth............................ | 73/67.5 |
| 3,653,259 | 4/1972 | McShane .............................. | 73/194 |
| 3,680,375 | 8/1972 | Joy et al. .............................. | 73/194 |
| 3,756,078 | 9/1973 | Yamasaki et al. ..................... | 73/194 |

OTHER PUBLICATIONS

Cedrone et al., "Electronic Pulse Method for Measuring the Velocity of Sound in Liquids and Solids," in Journal of Acoustical Soc. of Am. Vol. 26, No. 6, pp. 963–966 11/54.

Primary Examiner—Herbert Goldstein
Attorney, Agent, or Firm—C. M. Lorin

[57] ABSTRACT

Disclosed are a method and apparatus for determining a quantity related to relative movement between a fluid and a body in the fluid around which the fluid divides. The relative flow past the body produces the von Karman phenomenon, wherein flow past an obstruction causes periodic fluid disturbances in the form of vortices that are shed alternately from opposite sides of the obstruction to form what is known as the Karman vortex street in the wake of the obstruction. It should be understood that Karman vortices and related fluid disturbances are referred to as being "periodic" although they are not perfectly periodic; they are nearly periodic and have an average period. As each vortex is formed, the flow shifts somewhat from one side of the obstruction to the other producing periodic fluid disturbances in the form of fluid oscillations just ahead (upstream) of the obstruction. Spaced acoustic signals are propagated across the fluid path just ahead of or behind the object and the frequency of fluctuations in the travel time of the acoustic signals due to the von Karman related disturbances are detected as a measure related to the relative movement between the fluid and the object. Such a measure may for example be velocity of the relative movement e.g. speed of a boat, velocity of fluid through a conduit, volume of fluid flow, etc.

3 Claims, 6 Drawing Figures 3,881,352

FLOWMETER APPARATUS AND METHOD

BACKGROUND OF THE INVENTION

In a U.S. Pat. application Ser. No. 175,463 of Robert Blackwell entitled Flowmeter (Westinghouse Docket No. 42,063), now U.S. Pat. No. 3,788,141 owned by the same assignee and filed on Aug. 27, 1971, there is described a flowmeter wherein von Karman related fluid oscillations in front of an object in a fluid are utilized to modulate an acoustic beam which is received and demodulated to provide an indication of a quantity related to relative movement between the object and the fluid. The emphasis in that disclosure is modulation of a CW (continuous wave) acoustic carrier signal.

SUMMARY OF THE INVENTION

The invention is directed to a system for determining relative flow or quantity by detecting fluctuations in travel time of acoustic pulses caused by von Karman related disturbances through which the acoustic pulses are forced to travel. In comparison with the CW amplitude modulation method, the pulse travel time technique of the present invention provides the following advantages: Essentially independent of signal level variations; critical tuning to transducer resonant frequency not required; no standing wave effects; good results for acoustic paths both ahead of and behind the obstruction, whereas in CW modulation, the results with the acoustic path behind the obstruction are not as good as with the acoustic path ahead of the obstruction, at least in some arrangements; in general, output signals are "cleaner", and output operation is more dependable.

In accordance with one embodiment of the invention, a flowmeter includes a strut fixed transversely of and within a conduit carrying a flowing fluid, and acoustic pulses are propagated into a zone of von Karman related disturbances caused by the interaction of the strut and the fluid, whereby travel times of the pulses fluctuate at a frequency related to the frequency of the von Karman disturbances. Direct travel times of pulses may be measured and the variations thereof detected, or indirect methods may be used such as the sing-around methods in which a pulse train is set up whose frequency is related to travel time and in which vortex-induced fluctuations in sing-around frequency can be detected.

"Acoustic" is synonymous with "sound" and encompasses sub-sonic, sonic (audible), and ultra-sonic frequencies. Although the invention may be practiced in any of these frequency ranges, ultra-sonic frequencies are preferred. It may be noted that definitions herein relating to "acoustics" are those recognized in "Glossary of Oceanographic Terms", second edition, 1966, sponsored by the U.S. Navel Oceanographic Office and obtainable from the Department of Documents, U.S. Government Printing Office.

DRAWINGS

FIG. 1a and FIG. 1b (an instant later) include structure and circuit block diagrams, with parts of the structure broken away illustrating a preferred embodiment of the invention in connection with detection of flow parameters of a fluid in a pipe. These figures also include fluid flow patterns showing how the propagation velocities of the acoustic signals passing therethrough are affected.

FIG. 2 is a chart showing waveforms associated with the circuit in FIG. 1a.

DESCRIPTION OF THE PREFERRED EMBODIMENT

Figure 1A:
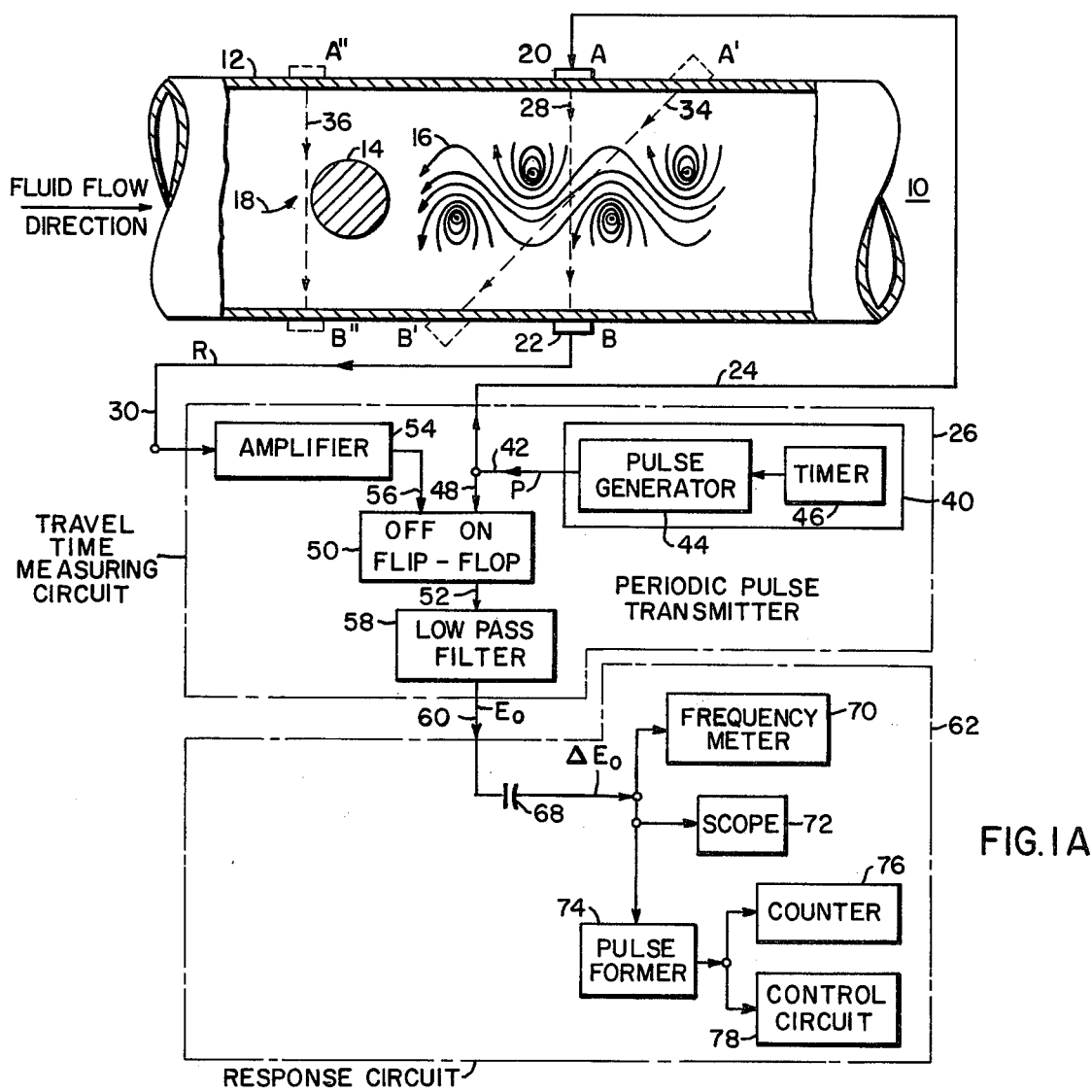

Referring now to FIG. 1a, a flowmeter 10 includes a conduit 12 and a vortex-shedding body 14 fixed within the conduit for generating oscillation in fluid flowing in the direction of the "fluid flow" arrow. By way of example, the body 14 is shown as an elongated strut disposed crosswise of the conduit 12 and having a circular cross section, although it may be of any other suitable cross-sectional configuration, such as oval, triangular, etc. The vortex pattern in the wake of strut 14 due to flow of fluid past the strut is shown at 15, the pattern being defined by stream lines with arrowheads indicating the direction of the streamline velocities. Alternate vortices are visible in the vortex pattern. FIG. 1a represents the vortex pattern at a given instant, while FIG. 1b shows the vortex pattern at a later instant.

Regardless of the shape of the shedding body 14, it will have a "frontal aspect", i.e., a surface generally facing upstream, which surface meets the flowing fluid. As hereinbefore pointed out, fluid oscillations are produced ahead of the strut 14 as a concomitant to the shedding of Karman vortices alternately from opposite sides of the strut as the flowing fluid "divides" therearound. The zone of these oscillations is contiguous to and extends upstream from the frontal aspect of the strut 14 in diminishing intensity as the upstream distance from the strut 14 increases.

Figure 1B:
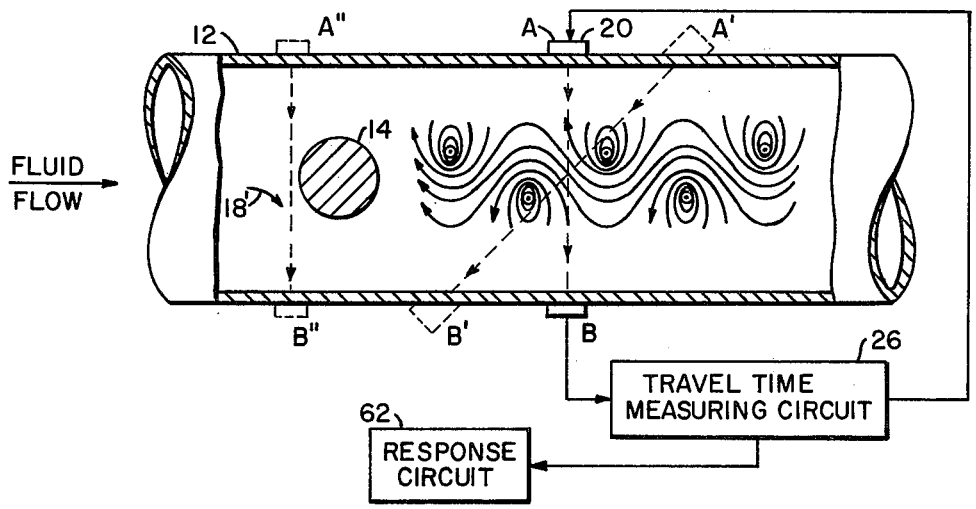

The periodic fluid disturbances in front of the strut 14 produce a lateral velocity shift in alternating generally opposite directions illustrated by the streamlines 18 and 18' in FIGS. 1a and 1b, both at different instants.

Coupled to the fluid, through the walls of the conduit 12 and mounted on opposite sides thereof, are respective electroacoustical transducers 20 and 22, for example, of the piezoelectric type. Transducer 20 converts spaced electric pulses received from the transmit output line 24 of a travel time measuring circuit 26 into corresponding acoustic energy pulses directed laterally across the conduit along as acoustic path 28 behind and crosswise of the strut 14, so that the acoustic path passes through the vortex zone in the wake of the strut. Transducer 22 is positioned at the other end of the acoustic path 28 to receive the spaced acoustic signals, and functions to convert the signals to corresponding electrical signals that are applied to the receive input line 30 of the travel-time measuring circuit 26, which senses and responds to fluctuations of the travel times of the acoustic signals.

An inspection of FIGS. 1a and 1b shows how the velocities associated with the periodic fluid disturbances ahead (upstream) of and in the wake (downstream) of strut 14 affect the propagation velocities of acoustic signals passing through zones of such disturbances. In these figures, A–B, A'–B' and A"–B" are possible positions of transmitter 20 and receiver 22 transducer sets.

In the drawings, the transducers are at positions A and B with the acoustic path 28 therebetween.

For the transducer positions A–B, and at the instant shown in FIG. 1a, the streamline velocities, which are superimposed on the net flow velocity, are in a direction which causes them to add to the no-flow sound velocity, while at the later instant shown in FIG. 1b, the streamline velocities are in a direction which causes the net sound propagation velocity to be decreased. Thus, the travel-time for acoustic signals crossing the conduit is alternately increased or decreased from the no-flow travel-time. If the transducers are placed at positions A'–B', the angled acoustic path therebetween will be as indicated at 34 which is essentially aligned with the streamlines in FIG. 1a and crossing them in FIG. 1b. Thus other path orientations are sensitive to the vortex effect.

If the transducers are placed in positions A''–B'', the acoustic path therebetween will be as indicated at 36, and the streamline 18 in FIG. 1a will be such as to oppose and decrease the signal velocity, while at a later instant in FIG. 1b, streamline 18' will be such as to add to the no-flow sound velocity.

The travel-time measuring circuit can be of a rudimentary type because it is only necessary to detect the frequency of travel-time fluctuations rather than to accurately measure small travel-time differences. Single direction sound propagation should suffice because sound velocity changes not related to flow will merely shift the level about which the fluctuations occur.

The travel-time measuring circuit 26 may be any circuit which senses and responds to the travel-time fluctuations of spaced acoustic signals propagated through the fluid disturbances for example, the basic travel-time measuring circuit shown in detail block diagram within the travel-time circuit 26 in FIG. 1a. Included in this circuit is a periodic pulse transmitter 40 which provides on its output line 42 electrical transmit pulses P generated periodically (for example, 26kHz) by a pulse generator 44 with a repetition period T determined by a timer 46. The output pulses P on line 42 are transmitted to the transmitting transducer 20 through the output line 24 of the travel-time measuring circuit 26. Each transmit pulse P is also applied to the ON or set line 48 of a flip-flop 50 to produce an output on a line 52.

Each transmit pulse P (FIGS. 1 and 2) applied to transducer 20 is converted by the transducer into a corresponding acoustic signal propagated along the acoustic path 28 toward transducer 22. The acoustic signal is received by transducer 22 and converted by it into a corresponding electrical receive signal R (FIGS. 1 and 2) which is sent to an amplifier 54 via the signal input line 30 of the travel-time measuring circuit 26. The amplified signal R is applied to the OFF or reset line 56 of flip-flop 50, thereby turning the flip-flop OFF. It will be appreciated that signals applied to the respective set and reset terminals of flip-flop 50 may require shipping as by a differentiating circuit.

Figure 2:
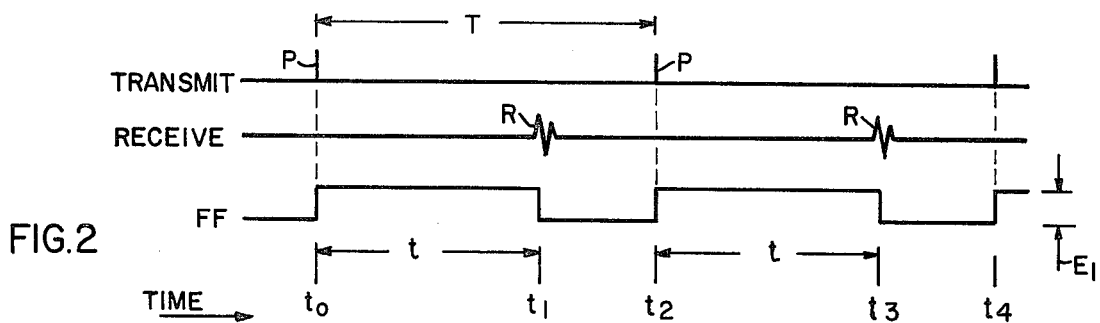

As seen in FIG. 2, the output waveforms FF of flip-flop 50 have an ON portion equal to the travel-time $t$ of the acoustic signals and a constant repetition period T. The voltage magnitude of the ON portion of the flip-flop wave is shown as $E_l$. The output of the flip-flop is passed through a low-pass filter 58 (FIG. 1a) to smooth the flip-flop waveform and provide, on an output line 60, a DC output voltage $E_o - (E_l t)/T$, which is the average value of the waveforms. Travel-time $t$ will fluctuate at a frequency that is essentially proportional to the fluid velocity. Fluctuations in travel-time $t$ cause corresponding fluctuations in the output voltage $E_o$.

Output voltage $E_o$ is essentially proportional to the fluid velocity, and may be read, measured, or interpreted by a suitable response system or device, for example any one or more of the elements of a response circuit 62 to which the output voltage $E_o$ is applied through the line 60, and which responds to the frequency components of the output voltage $E_o$. In the illustrated response arrangement example, the alternating component $\Delta E_o$ of the output voltage $E_o$ is passed through a capacitor 68 and applied to a frequency meter 70, and an oscilloscope 72, and through a pulse former 74 to a counter 76 and a control circuit 78. The frequency meter may be calibrated in terms of fluid velocity, and the counter may be used to count pulses to provide an indication of total quantity of fluid flow within a certain period of time. The control circuit 78 may be employed to control fluid flow parameters in accordance with pulse rate.

Since $\Delta E_o = (E_l \Delta t)/T$, where $\Delta t$ represents travel-time fluctuations, fluctuations $\Delta E_o$ are proportional to travel-time fluctuations $\Delta t$. Capacitor 68 blocks the DC and the slow changes in output corresponding to sound velocity changes. Normally, repetition period T would be made as small as possible consistent with the range of values expected for travel time $t$ to facilitate removal of the repetition frequency with the low pass filter 58 and to maximize the output level.

Figure 3:
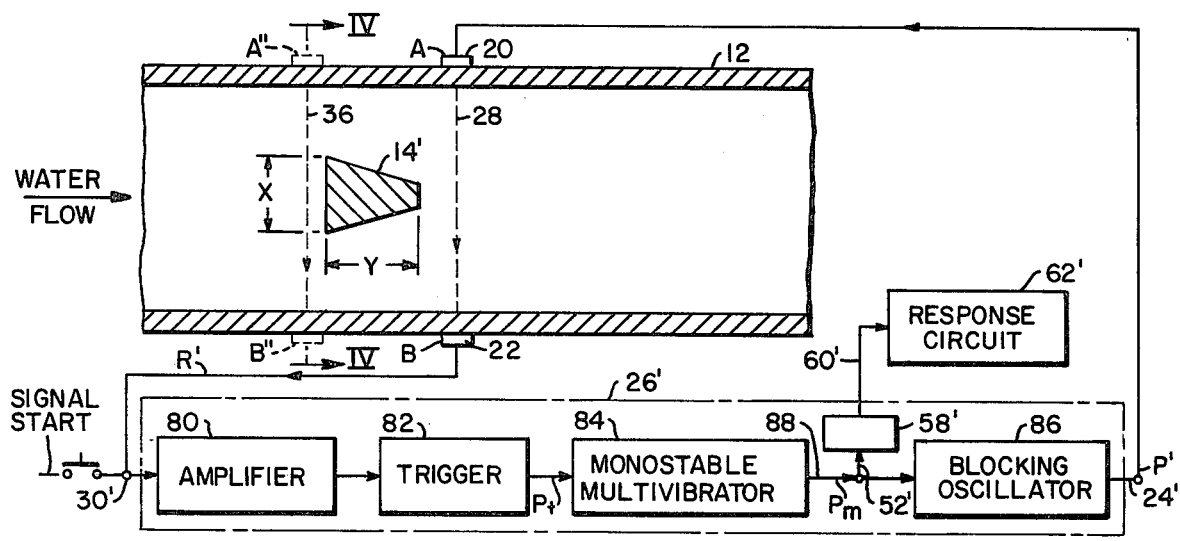
FIGS. 3 and 4 illustrate a variation of the system of FIG. 1a with a diagram of an alternative pulse travel-time measuring circuit, FIG. 4 being a sectional view of the fluid pipe of FIG. 3, the section being taken on line IV—IV of that figure.
Figure 4:
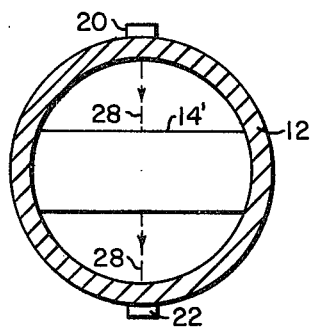

The system of FIGS. 3 and 4 uses the sing-around technique to measure the travel-time changes in an acoustic path. In the example shown in FIGS. 3 and 4, a vortex shedding body 14' in the form of a strut having a wedge shaped cross section is fixed crosswise within the conduit 12. An electroacoustic transmitting transducer 20 is disposed at a position on one side of conduit 12 to propagate acoustic pulses along a path 28 toward a receiving electroacoustic transducer 22 at a position B at the opposite side of conduit 12. Alternative transducer location and resulting acoustic path are shown at A''–B'' and path 36.

Transducer 20 receives electrical transmit pulses P' from the transmit line 24' of a travel-time measuring circuit 26'. Receiving transducer 22 converts acoustical signals to electrical signals R' which are passed to the receive or input line 30' of the travel-time measuring circuit 26'. In the example of FIG. 3, the travel-time measuring circuit 26' differs in detail from the travel-time circuit 26 of FIG. 1. Circuit 26' of FIG. 3 is in the form of a sing-around circuit which may be of any suitable known design for example, the one shown and including an amplifier 80, a trigger 82, a monostable multivibrator 84, and a pulse generator 86. Receive line 30' is connected to the input of amplifier 80 which in response to signals on line 30' drives the trigger 82 to trigger the monostable multivibrator 84 whose output line 88 is connected to the input of pulse generator 86 and through a low pass filter 58' to the input line 60' of the response circuit 62'. Pulse generator 86 is of a type that will generate an output pulse P' in response to turn-ON of the one-shot 84. Thus, pulse generator 86 may for example be a blocking oscillator (as shown) that will perform that function.

Figure 5:
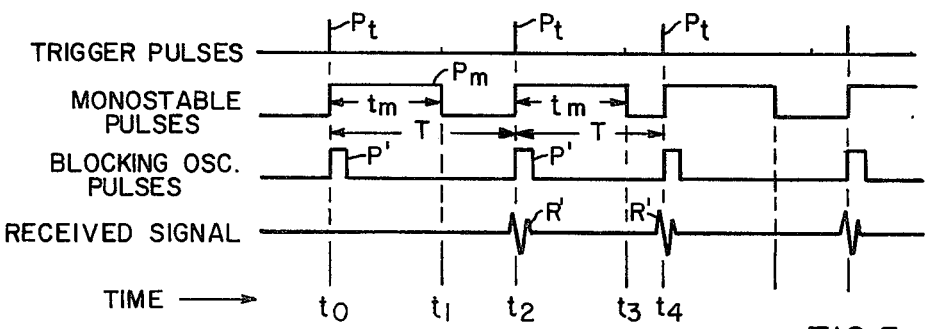
FIG. 5 is a chart showing waveforms associated with the circuit in FIG. 3.

In response to a momentarily applied start signal on line 30', trigger 82 at time $t_o$ (FIG. 5) applies a triggering pulse $P_t$ to the multivibrator 84 thereby triggering the mono which produces a pulse $P_m$ of constant duration $t_m$, where $t_m$ is less than any possible length of repetition period T. The pulse $P_m$ is applied to both the pulse generator 86 and the response circuit 62'. In response to the start of the pulse $P_m$, blocking oscillator 86 generates a pulse P' which is transmitted along its output line 24' to the transmit transducer 20. The resulting acoustic pulse is propagated along the acoustic path 28 toward the receiving transducer 22 where it is received at for example, time $t_2$ and converted to an electric received signal R' that is applied to the input of amplifier 80.

In the meantime, multivibrator 84 times out at time $t_1$ thus terminating the pulse $P_m$. In response to the receive signal R' at time $t_2$, trigger 82 turns ON the multivibrator 84 to start a repetition of the previous operational cycle. In response to turn-ON, multivibrator 84 supplies a pulse $P_m$ to the pulse generator 86 and the response circuit 90, and the rest of the previous operation is repeated. The operational cycle is continuously repeated with a repetition period T dependent on the travel-time of the acoustic signals. Although the duration $t_m$ of pulses $P_m$ is constant, the repetition period T will vary in accordance with the variations of the travel-time of the acoustic pulses through the fluid. Thus, the system of FIG. 3 uses the sing-around technique to generate a train of pulses with a repetition period equal to the travel-time T and a sing-around frequency $f$ which is equal to $1/T$.

The acoustic pulse resulting from the pulse P' at time $t_2$ is received at transducer 22 at time $t_4$ and converted into an electrical receive signal R'. As before, mono 84 times out at time $t_3$. It will be noted that while the duration $t_m$ of pulses $P_m$ was constant, the repetition period T changed due to a change in the "speed" of the acoustic path 28. The change shown is exaggerated for illustrative purposes. Actually the changes would occur more slowly on the time scale shown. Typically, and depending on the parameters in a particular case, 100-1000 sing-around cycles would occur during one vortex cycle. The system "cycles" repetitively in the manner described at a sing-around frequency that varies in accordance with the fluctuations in the travel-times of the acoustic signals through the fluid in the conduit.

The equivalent function of the monostable multivibrator 84 can be obtained with a free-running multivibrator that is triggered at a higher rate than its free-running rate. This is an advantageous arrangement because it is self-starting initially and self-restarting if an acoustic pulse is missed.

The average value $E_o$ of the waveform on output line 60' equals $E_l t_m (1/T) = E_l t_m f$, where $f = 1/T$ is the sing-around frequency.

The multivibrator output on line 52' is treated identically to the flip-flop output on line 52 in the time measuring system of FIG. 2, to produce an output signal whose frequency is indicative of fluid flow velocity. In this case, $t_m$ should be maximized to improve the low pass filtering action and increase the output level. The output on line 60' is applied to a response circuit 62' which by way of example is the same as the response circuit 62 in the system of FIG. 2.

In a working example of the system in FIG. 3, some of the dimensions were approximately as follows: conduit 12, internal diameter 2 in.; the width dimension X of strut 14', 0.6 in.; depth dimension Y of strut 14', 0.9 in. The centers of the two acoustic paths used were: for acoustic path 28, 0.25 in. behind (downstream) the trailing edge of strut 14'; and for acoustic path 36, 0.05 in. ahead (upstream) of the forward edge of the strut 14'. The sing-around frequency was approximately 26 kHz and the shedding frequencies measured were in the 8 Hz to 100 Hz range. The low pass filter 58' in the response circuit 62' removed the 26 kHz component. The diameter of the output "window" of the transducer 20 was about 3/16 inches and the width of the acoustic beam about the same. In another example, a 1/8 in. diameter round strut was successfully used in the above environment.

With the above working example, at flow velocities of 3 feet per second and 6 feet per second, the vortex shedding frequencies observed on an oscilloscope were approximately 20/cps and 36/cps, respectively. The disclosed dimensions, configurations and embodiments are by way of example only, and any other suitable configurations and relations may be employed to implement the invention.

It should be further understood that, although a diametrically opposed position relationship for the transducers where the receiver transducer is in line with the axis of the acoustic beam as projected from the transmitting transducer is preferred, other relative positions of the transducers may be employed. They may still be in line along the acoustic path, but not necessarily diametrically across from each other. Also, refractive or reflective acoustic paths may be used. For example, with both transducers on one side of the conduit, the signal could be reflected from the strut 14' or from the other side of the conduit. The acoustic path can have any orientation relative to the strut 14' that produces a disturbance related to the shedding frequency effect. The transducers may be acoustically coupled to the fluid through the conduit walls as shown, or they may penetrate the conduit walls for direct coupling with the fluid.

In comparison with the CW (continuous wave) signal amplitude modulation method, the pulse travel time method of the present invention offers the following advantages: essentially independent of signal level variations; critical tuning to transducer resonant frequency not required; no standing wave effects; successful results for acoustic paths both ahead of and behind the strut; and in general output signals were cleaner and operation more dependable.

In connection with the invention, the travel-time measuring circuit may be a travel-time difference measuring circuit with one or two directions of transmission, and using one or more pairs of transducers, and in which the difference is measured in terms of phase difference, time difference, or frequency difference. For phase measurement with pulses, the transmit pulses would be tone bursts or bursts of carrier signals, rather than sharp pulses as heretofore described.

By way of further example, the pulses P and P', may, instead of sharp pulses, be tone bursts of a carrier, so that each burst provides the function of a pulse P or P' as the case may be. To this end the pulse generators 44 and 86 in FIGS. 1a and 3 may be of the type whose each output pulse is a tone burst or a burst of a carrier, each burst having a number of cycles, for example a gated carrier arrangement.

It should be understood that the disclosed embodiments and components are employed by way of example only and are not intended to limit the invention to the specific examples shown.

I claim:

1. An apparatus for measuring the velocity of relative movement in a direction of displacement between a fluid and a body immersed therein, the cross-section of said body being such that fluid disturbances varying at a frequency characteristic of said velocity are created in a zone extending in front and in the wake of said body, said apparatus comprising:

a pulse generator having a constant repetition rate;

transmitting transducer means energized by said pulse generator for directing acoustic signals at said constant repetition rate across said zone at an angle to said direction of displacement;

receiving transducer means responsive to said transmitted acoustic signals after modulation by said disturbances in said zone;

means responsive to said transmitting transducer means and to said receiving transducer means for deriving amplitude signals representing respective time intervals, each time interval being defined between the transmision of one of said acoustic signals by said transmitting transducer means and the reception by said receiving transducer means of a corresponding one of said transmitted acoustic signals; and means responsive to said amplitude signals for detecting a frequency signal characteristic of fluctuations in the amplitude of said amplitude signals said frequency signal being representative of said velocity.

2. An apparatus according to claim 1 with said detecting means including filter means for extracting said frequency signals.

3. An apparatus according to claim 2 with said detecting means further including a frequency indicator responsive to the output of said filter means.

* * * * *